United States Patent
D'Agostini

(10) Patent No.: US 8,555,796 B2
(45) Date of Patent: Oct. 15, 2013

(54) PROCESS TEMPERATURE CONTROL IN OXY/FUEL COMBUSTION SYSTEM

(75) Inventor: Mark Daniel D'Agostini, Ebensburg, PA (US)

(73) Assignee: Air Products and Chemicals, Inc., Allentown, PA (US)

( * ) Notice: Subject to any disclaimer, the term of this patent is extended or adjusted under 35 U.S.C. 154(b) by 845 days.

(21) Appl. No.: 12/238,731

(22) Filed: Sep. 26, 2008

(65) Prior Publication Data

US 2010/0077946 A1  Apr. 1, 2010

(51) Int. Cl.
  *F23N 5/02* (2006.01)
  *F23B 80/00* (2006.01)

(52) U.S. Cl.
  USPC ............ 110/204; 110/190; 110/342; 110/348

(58) Field of Classification Search
  USPC ......... 110/185, 204, 205, 186, 188, 190, 342, 110/348; 122/479.1, 479.2
  See application file for complete search history.

(56) References Cited

U.S. PATENT DOCUMENTS

| | | | |
|---|---|---|---|
| 2,865,344 A | | 12/1958 | Firl |
| 2,897,797 A | * | 8/1959 | Koch ............................. 122/478 |
| 2,980,082 A | | 4/1961 | Firl |
| 3,880,570 A | * | 4/1975 | Marshall .......................... 431/4 |
| 4,547,351 A | * | 10/1985 | Im et al. ........................ 110/342 |
| 5,784,975 A | * | 7/1998 | Tanca ............................ 110/245 |
| 5,943,865 A | | 8/1999 | Cohen |
| 6,042,365 A | | 3/2000 | Chen |
| 6,119,606 A | * | 9/2000 | Clark ............................ 110/345 |
| 6,314,896 B1 | | 11/2001 | Marin |
| 6,401,633 B2 | * | 6/2002 | Baudhuin ...................... 110/233 |
| 6,532,881 B2 | * | 3/2003 | Marin et al. ................... 110/345 |
| 6,702,569 B2 | * | 3/2004 | Kobayashi et al. ........... 110/348 |
| 6,883,443 B2 | * | 4/2005 | Rettig et al. ................... 110/343 |
| 6,935,251 B2 | | 8/2005 | Marin |
| 6,938,590 B2 | | 9/2005 | Buelna |
| 7,350,471 B2 | * | 4/2008 | Kalina .......................... 110/348 |
| 2001/0000863 A1 | | 5/2001 | Marin et al. |
| 2005/0072379 A1 | * | 4/2005 | Gross ....................... 122/235.11 |

FOREIGN PATENT DOCUMENTS

WO    2007117243 A1    10/2007

OTHER PUBLICATIONS

Kevin Boyle Fogash, Combustion System With Steam or Water Injection, U.S. Appl. No. 12/238,632, filed Sep. 26, 2008.
Aleksandar Georgi Slavejkov, Combustion System With Precombustor, U.S. Appl. No. 12/238,644, filed Sep. 26, 2008.

(Continued)

*Primary Examiner* — Kenneth Rinehart
*Assistant Examiner* — David J Laux
(74) *Attorney, Agent, or Firm* — Michael K. Boyer; Larry S. Zelson

(57) ABSTRACT

An oxy/fuel combustion system having a furnace arranged and disposed to combust a fuel to form a combustion fluid. The system further includes a convective section having at least one heat exchanger arranged and disposed to exchange heat between the combustion fluid and steam for use in a steam turbine. A flue gas recycle is arranged and disposed to recycle at least a portion of the combustion fluid as a recycled flue gas, the flue gas recycle having at least two expellant locations downstream of a primary combustion zone. The system includes a flow control mechanism that provides controlled amounts of the recycled flue gas to the at least two expellant locations to control temperature of the steam.

21 Claims, 10 Drawing Sheets

(56) References Cited

OTHER PUBLICATIONS

Mark Daniel D'Agostini, Oxy/Fuel Combustion System With Minimized Flue Gas Recirculation, U.S. Appl. No. 12/238,657, filed Sep. 26, 2008.

Reed Jacob Hendershot, Convective Section Combustion, U.S. Appl. No. 12/238,671, filed Sep. 26, 2008.

Reed Jacob Hendershot, Oxy/Fuel Combustion System Having Combined Convective Section and Radiant Section, U.S. Appl. No. 12/238,695, filed Sep. 26, 2008.

Mark Daniel D'Agostini, Oxy/Fuel Combustion System With Little or No Excess Oxygen, U.S. Appl. No. 12/238,612, filed Sep. 26, 2008.

Mark Daniel D'Agostini, Oxygen Control System for Oxygen Enhanced Combustion of Solid Fuels, U.S. Appl. No. 12/138,755, filed Jun. 13, 2008.

Jeffrey William Kloosterman, Transient Operation of Oxy/Fuel Combustion System, U.S. Appl. No. 12/238,713, filed Sep. 26, 2008.

Mark Daniel D'Agostini, Combustion System With Precombustor, U.S. Appl. No. 61/100,372, filed Sep. 26, 2008.

Mark Daniel D'Agostini, Combustion System With Precombustor for Recycled Flue Gas, U.S. Appl. No. 12/566,819, filed Sep. 25, 2009.

* cited by examiner

PROCESS TEMPERATURE CONTROL IN OXY/FUEL COMBUSTION SYSTEM

CROSS-REFERENCE TO RELATED APPLICATIONS

This Application is related to application Ser. No. 12/238,612, entitled "OXY/FUEL COMBUSTION SYSTEM WITH LITTLE OR NO EXCESS OXYGEN", filed contemporaneously with this Application on Sep. 26, 2008, assigned to the assignee of the present disclosure and which is herein incorporated by reference in its entirety, application Ser. No. 12/238,632, entitled "COMBUSTION SYSTEM WITH STEAM OR WATER INJECTION", filed contemporaneously with this Application on Sep. 26, 2008, assigned to the assignee of the present disclosure and which is herein incorporated by reference in its entirety, application Ser. No. 12/238,644, entitled "COMBUSTION SYSTEM WITH PRECOMBUSTOR", filed contemporaneously with this Application on Sep. 26, 2008, assigned to the assignee of the present disclosure and which is herein incorporated by reference in its entirety, application Ser. No. 12/238,657, entitled "OXY/FUEL COMBUSTION SYSTEM WITH MINIMIZED FLUE GAS RECIRCULATION", filed contemporaneously with this Application on Sep. 26, 2008, assigned to the assignee of the present disclosure and which is herein incorporated by reference in its entirety, application Ser. No. 12/238,671, entitled "CONVECTIVE SECTION COMBUSTION", filed contemporaneously with this Application on Sep. 26, 2008, assigned to the assignee of the present disclosure and which is herein incorporated by reference in its entirety, application Ser. No. 12/238,695, entitled "OXY/FUEL COMBUSTION SYSTEM HAVING COMBINED CONVECTIVE SECTION AND RADIANT SECTION", filed contemporaneously with this Application on Sep. 26, 2008, assigned to the assignee of the present disclosure and which is herein incorporated by reference in its entirety, and application Ser. No. 61/100,372, entitled "COMBUSTION SYSTEM WITH PRECOMBUSTOR", filed contemporaneously with this Application on Sep. 26, 2008, assigned to the assignee of the present disclosure and which is herein incorporated by reference in its entirety.

FIELD OF THE DISCLOSURE

The present disclosure is directed to a combustion system. In particular, the present disclosure is directed to an oxy/fuel combustion system with controlled flue gas recycle.

BACKGROUND OF THE DISCLOSURE

Factors influencing steam temperature variation constantly change in a modern power boiler. The principal factors driving steam temperature variation are boiler fouling, changes in load, and shifts in fuel quality. At the same time, accurate control of the final steam temperature attained in a modern power boiler is critical from both a performance and reliability perspective. A deviation of 35° to 40° F. in final steam temperature corresponds to a change of approximately one percent in turbine cycle heat rate. Off-design steam temperature can also lead to reductions in steam generator output. In addition, prolonged operation at higher-than-design steam temperatures can lead to exceeding design stress limits in boiler and turbine-cycle metal components, while prolonged operation at lower-than-design steam temperatures can result in moisture erosion damage in the final lower pressure stage.

Known control techniques to regulate final steam temperature during operation include soot blowing, attemperating water sprays injected into the steam conduit, bypassing of flue gas around heat exchangers, and tilting burners.

Known flue gas recycle is capable of directly controlling only one of the steam temperatures, while allowing inaccuracy in the control of other steam temperatures. This inaccuracy leads to penalties in thermal efficiency, power generation, and/or unit reliability. In a known flue gas recycle (FGR), flue gas is recycled upstream of the inlet of a convective pass (perhaps in a furnace itself) in a combustion system to achieve steam attemperation. This method is inherently unable to simultaneously control both the main (i.e. throttle) steam and reheat steam temperatures. Known flue gas recycle is capable of directly controlling only one of the steam temperatures, while allowing inaccuracy in the control of other steam temperatures. This inaccuracy leads to penalties in thermal efficiency, penalties in power generation, and/or penalties in unit reliability.

Attainment of design main and reheat steam temperatures is important for achieving optimal thermal efficiency, more power generation, and higher steam turbine reliability. Operating steam temperatures in conventional air/fuel boilers can be affected by factors such as changes in unit load, variability in fuel quality, and fouling of heat exchanger sections. In general, the response of main and reheat steam temperature to the various disturbances result in different magnitude deviations of steam temperature from the set point values. The challenges of maintaining independent steam temperature control in oxy/fuel boilers is further compounded by the lack of empirical data to accurately predict the heat release and fouling characteristics in this future technology. Hence, the potential exists for significant steam temperature bias (i.e. deviation from desired values) inadvertently built into the boiler design, as well as larger deviations occurring during normal operation.

Oxy/coal combustion technology (combustion technology for combusting coal with oxygen) has no industrial scale operating data upon which to predict the effects that changes in factors such as flame and gas emissivity, flame length, slagging and fouling, etc. have on boiler performance. To accommodate this, a larger range of control of steam temperature than for existing air/fuel designs is desired in order to avoid performance and reliability concerns.

What is needed is a device and method for achieving independent control of multiple steam temperatures in an oxy/fuel boiler employing flue gas recycle which, by so doing, substantially avoids the aforementioned penalties.

SUMMARY OF THE DISCLOSURE

According to an embodiment, an oxy/fuel combustion system having a furnace arranged and disposed to combust a fuel to form a combustion fluid. The system further includes a convective section having at least one heat exchanger arranged and disposed to exchange heat between the combustion fluid and steam for use in a steam turbine. A flue gas recycle is arranged and disposed to recycle at least a portion of the combustion fluid as a recycled flue gas, the flue gas recycle having at least two expellant locations downstream of a primary combustion zone. A flow control mechanism is arranged and disposed to selectively provide the recycled flue gas to the combustion fluid, the flow control mechanism having a plurality of conduits and is capable of controlling flow of recycled flue gas. The flow control mechanism provides controlled amounts of the recycled flue gas to the at least two expellant locations to control temperature of the steam.

According to another embodiment, a method of combustion that includes combusting a fuel in a furnace to form a combustion fluid and exchanging heat between the combustion fluid and steam for use in a steam turbine. The method further includes delivering the combustion fluid to a convective section and exchanging heat between the combustion fluid and steam for use in a steam turbine. At least a portion of the combustion fluid is recycled as recycled flue gas. Recycled flue gas is selectively provided to at least two expellant locations to independently control temperature of the steam in a plurality of steam conduits.

An advantage of the present disclosure is the ability to control multiple steam temperatures in an oxy/fuel boiler.

A further advantage of the present disclosure is improved efficiency for a combustion system.

A further advantage of the present disclosure is the broader range of temperature control available.

Further aspects of the method and system are disclosed herein. The features as discussed above, as well as other features and advantages of the present disclosure will be appreciated and understood by those skilled in the art from the following detailed description and drawings.

BRIEF DESCRIPTION OF THE DRAWINGS

Wherever possible, the same reference numbers will be used throughout the drawings to represent the same parts.

DETAILED DESCRIPTION OF THE DISCLOSURE

The present disclosure now will be described more fully hereinafter with reference to the accompanying drawings, in which a preferred embodiment of the disclosure is shown. This disclosure may, however, be embodied in many different forms and should not be construed as limited to the embodiments set forth herein; rather, these embodiments are provided so that this disclosure will be thorough and complete and will fully convey the scope of the disclosure to those skilled in the art.

Embodiments of the present disclosure include a device and method for controlling temperatures of steam in an oxy/fuel boiler employing flue gas recycle. Specifically, the present disclosure includes a device and method of independently controlling the temperature of steam in a main steam conduit and a reheat steam conduit in an oxy/fuel boiler employing flue gas recycle. The disclosure includes both a flue gas recycle injection configuration and steam temperature control system for achieving dual (main steam conduit and reheat steam conduit) temperature control.

As used herein, the term "solid fuel" and grammatical variations thereof refers to any solid fuel suitable for combustion purposes. For example, the disclosure may be used with many types of carbon-containing solid fuels, including but not limited to: anthracite, bituminous, sub-bituminous, and lignite coals; tar; bitumen; petroleum coke; paper mill sludge solids and sewage sludge solids; wood; peat; grass; and combinations and mixtures of all of those fuels. As used herein, the term "oxygen" and grammatical variations thereof refers to an oxidizer having an $O_2$ concentration greater than that of atmospheric or ambient conditions. As used herein, the term "oxy/coal combustion" and grammatical variations thereof refers to coal combustion in oxygen, the term "air/coal combustion" and grammatical variations thereof refers to coal combustion in air, the term "oxy/fuel combustion" and grammatical variations thereof refers to fuel combustion in oxygen, and the term "air/fuel combustion" and grammatical variations thereof refers to fuel combustion in air. As used herein, the term "combustion fluid" and grammatical variations thereof refers to a fluid formed from and/or mixed with the products of combustion, which may be utilized for convective heat transfer. The term is not limited to the products of combustion and may include fluids mixed with or otherwise traveling through at least a portion of combustion system. Although not so limited, one such example is flue gas. As used herein, the term "recycled flue gas" and grammatical variations thereof refers to combustion fluid exiting the system that is recirculated to any portion of the system. As used herein, the term "flue gas recycle" and grammatical variations thereof refers to a configuration permitting the combustion fluid to be recirculated.

Figure 1:
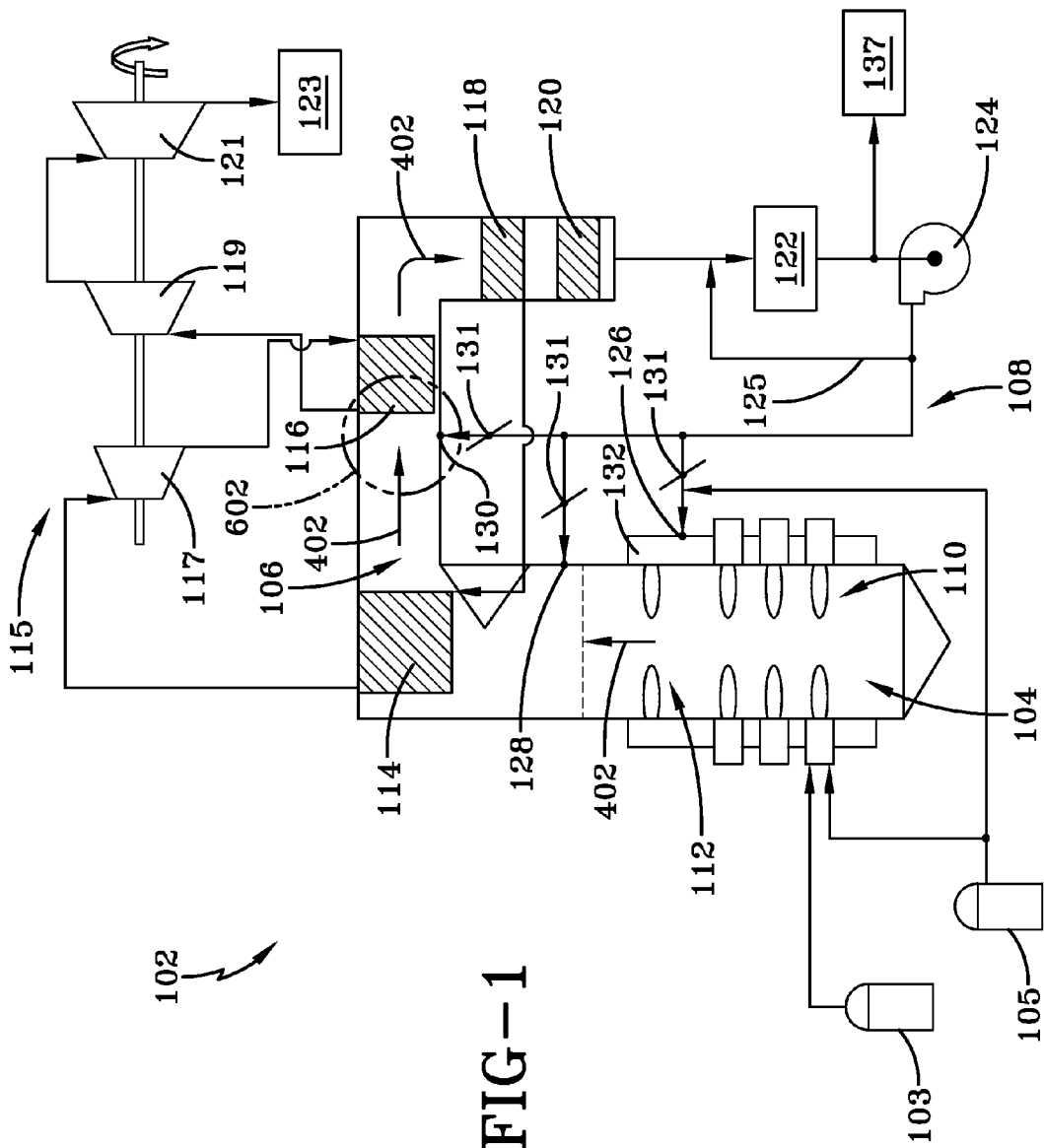
FIG. 1 illustrates a schematic view of an exemplary embodiment of a combustion system with steam control.

As illustrated in FIG. 1, an embodiment of the device is depicted as an oxy/coal combustion system 102. The term "combustion system" as used herein is not intended to limit the system to regions where combustion occurs. The combustion system 102 includes a furnace 104, a convective section 106, and a flue gas recycle 108. Heat transfer within the furnace 104 occurs principally (but not exclusively) by radiation heat transfer. As illustrated, the furnace 104 includes a primary combustion zone 110. In the illustrated embodiment, the furnace 104 further includes and a secondary combustion zone 112. In another embodiment, the furnace does not include a secondary combustion zone 112. The term "general combustion zone" as used herein includes the primary combustion zone 110, the secondary combustion zone 112, or the primary combustion zone 110 and the secondary combustion zone 112. In the embodiment illustrated by FIG. 1, the primary combustion zone 110 is arranged and disposed to permit a majority of a fuel 103 and an oxidant 105 to be injected into it. The primary combustion zone 110 substantially controls the heat release profile within the furnace 104. Combustion of the fuel in the furnace 104 forms a combustion fluid 402 or flue gas.

In the embodiment illustrated in FIG. 1, the secondary combustion zone 112 is arranged and disposed to permit only the oxidant to be injected into it. The secondary combustion zone 112 is generally used for "staged" fuel and/or oxidant injection, often for either the purpose of reducing $NO_x$ emissions or altering the heat release profile. In one embodiment, the remainder of the fuel and the oxidant are injected into the secondary combustion zone 112. Control of the split of fuel between the primary combustion zone 110 and the secondary combustion zone 112 is determined based upon parameters such as heat flux or tube temperatures measured within the primary combustion zone 110, combustion gas temperature measured at the exit of the furnace 104, or steam pressure or other steam and/or combustion gas parameters determined based on specific characteristics of the combustion system 102.

In the embodiment illustrated by FIG. 1, the convective section 106 is adjacent to the furnace 104 on the downstream side. As illustrated, the convective section 106 is in fluid communication with the furnace 104. The convective section 106 includes a plurality of heat exchangers for transferring energy from a combustion fluid 402 to one or more streams of water or steam (not shown), wherein convection is a principal (though not the exclusive) heat transfer mode.

The embodiment illustrated in FIG. 1 further includes four of the heat exchangers in the convective section 106. As illustrated, the heat exchangers are a secondary superheater 114, a reheat superheater 116, a primary superheater 118, and an economizer 120. In addition, the embodiment illustrated in FIG. 1 includes a steam turbine 115. The steam turbine 115 comprises multiple sections, each with a separate steam intake and exit. In the embodiment illustrated in FIG. 1, the steam turbine has three sections. Steam enters a higher pressure turbine section 117 from the secondary superheater 114, which is arranged and disposed to heat the main steam conduit (or throttle steam) to its final value prior to the steam entering the higher pressure section of the turbine. After exiting the higher pressure turbine section 117, the partially expanded and cooled steam is delivered to the reheat superheater 116, which is arranged and disposed to reheat discharge from the higher pressure turbine 117 prior to the discharge re-entering the turbine in an intermediate pressure stage 119. Upon exiting the reheat superheater 116, the steam expands through the intermediate pressure turbine stage 119, then immediately enters and expands through a lower pressure turbine section 121, following which it is delivered to a condenser 123. It must be recognized that there are likely to be one or more locations along the steam path where steam is removed and used for one or more purposes not illustrated in FIG. 1. Such uses include, but are not limited to, sootblowing, desuperheating, and heating of boiler feedwater. As a result of these extractions, the steam flow leaving the lower pressure turbine 121 may be lower than the steam flow entering the higher pressure turbine 117. The primary superheater 118 is arranged and disposed to permit the first stage of main steam conduit superheating. The economizer 120 is arranged and disposed to heat water from the condenser 123 prior to the water entering the furnace 104. Those skilled in the art will appreciate that there are numerous other configurations of heat exchangers that can be incorporated into the system 102. Hence, the disclosure is not limited to the configuration illustrated in FIG. 1.

In the embodiment illustrated in FIG. 1, at least a portion of the combustion fluid 402 is withdrawn from the system 102 after passing through a cooling and cleanup apparatus 122 located downstream of the convective section 106. The cooling and cleanup apparatus 122 may be any apparatus selected from the group consisting of an oxidant preheater, an electrostatic precipitator, a wet scrubber, other similar apparatuses, and combinations thereof. Generally, the temperature of the flue gas exiting the cooling and cleanup apparatus 122 is approximately below 400° F. The withdrawn combustion fluid 402 or recycle flue gas enters a recycle blower 124 and is directed to one or more of four conduits leading to different locations in the combustion system 102: a furnace expellant location 126, an intermediate expellant location 128, a convective expellant location 130, or a bypass conduit 125. While three expellant locations 126, 128, and 130 are shown, the disclosure may include additional expellant locations or any number of expellant locations equal to or greater than two that provide independent steam temperature control of steam in the steam conduits. In addition, the remaining portion of the combustion fluid may be provided to a $CO_2$ purification unit 137, wherein $CO_2$ may be removed from the combustion fluid 402. While the disclosure includes a $CO_2$ purification unit 137, the $CO_2$ purification unit 137 may be omitted and/or other components and/or operation may be utilized to treat and/or dispose of the combustion fluids.

As illustrated in FIG. 1, the furnace expellant location 126 is arranged and disposed to permit mixing of the recycled flue gas with oxygen in a windbox 132 or plenum. The windbox 132 is arranged and disposed to permit the recycled flue gas to be delivered into the primary combustion zone 110, the secondary combustion zone 112, or both. This arrangement may be used to moderate burner flame characteristics, to control the heat release pattern and furnace exit gas temperature, and to use the recycled flue gas as a diluent/carrier gas for oxygen injected into the secondary combustion zone 112. In another embodiment, the mixing of oxygen occurs within the windbox 132. In a further embodiment, the mixing of oxygen occurs prior to the oxygen reaching the windbox 132. In yet another embodiment, the mixing of the oxygen occurs in the furnace expellant location 126. In still yet another embodiment, oxygen may be delivered to one or more fuel burners.

As illustrated in FIG. 1, the intermediate expellant location 128 is positioned at a section downstream from the primary combustion zone 110 and the secondary combustion zone 112, but upstream from the convective section 106. The intermediate expellant location 128 is arranged and disposed to control combustion fluid 402 flowing from the general combustion zone to the convective section 106, where the recycled flue gas from the intermediate expellant location 128 mixes with the combustion fluid 402 exiting the furnace 104, thereby moderating the temperature and flow rate as the combustion fluid 402 reaches the secondary superheater 114, which in turn controllably adjusts the amount of heat transfer within the secondary superheater 114. This control permits the control of the final steam temperature in the main steam conduit entering the higher pressure turbine 117. In one embodiment, this control action is achieved by means of a thermocouple, RTD, or other temperature transmitter located in the secondary superheater 114 exit to relay a value of the main steam temperature to a main controller, which in turn sends a signal to a control valve 131 preceding the intermediate expellant location 128 instructing control valve 131 to incrementally open or close until the difference between the actual main steam temperature, as measured by the thermocouple is satisfactorily close to the main steam temperature setpoint. In another embodiment, the method for achieving this control is by means of a thermocouple sending a signal to the flow control valve 131 preceding the furnace expellant location 126, which results in a modification of the furnace 104 exit gas temperature. It must be recognized, however, that this action may also directly influence burner flame properties and heat release characteristics, which may not be desirable.

As illustrated in FIG. 1, the convective expellant location 130 is in the region of the convective section 106 immediately upstream from the reheat superheater 116. The convective expellant location 130 is arranged and disposed to control combustion fluid 402 thereby moderating the temperature and flow rate of combustion fluid 402 entering the convective section 106, while controlling the steam temperature exiting the reheat superheater 116 and entering an intermediate pressure turbine 119. It will be appreciated that flue gas recycle and re-injection carried out in this manner will enable control of the final temperature of steam in the reheat steam conduit in a manner that is substantially independent from the control of the temperature of steam in the main steam conduit. In one embodiment, the main control system receives a signal from a thermocouple, RTD, or other temperature transmitter located in exit of the reheat superheater 116, and uses the signal to incrementally open or close flow control valve 131 preceding the convective expellant location 130. It will be appreciated that modulation of the flow control valve 131 located in the convective expellant location 130 may also be used to (indirectly) control the reheat steam temperature. However, in doing so the main steam temperature increases or decreases, which may be an undesirable consequence. It will also be appreciated that the main control system may monitor process signals beyond the steam temperature to ensure that steam temperature control is exercised in a safe manner. These variables may include, but are not limited to, the combustion fluid 402 temperature entering the convective section 106, combustion fluid 402 temperature exiting the convective section 106, steam pressure, boiler tube metal temperatures, and heat fluxes. While expellant locations 126, 128, and 130 are shown as each having a flow control valve 131, the disclosure is not so limited. Flow may be controlled to expellant locations 126, 128, and 130 in any suitable manner including nozzle arrangements, pumps, blowers or any other arrangement that permits control of flow.

As illustrated in FIG. 1, a bypass conduit 125 may be used to transport recycled flue gas from the discharge of the recycle blower 124 and to the intake of the recycle blower 124. The bypass conduit 125 may be utilized without a flow control valve or other flow control device. However, in other embodiments, the amount of recycled glue gas through bypass 125 may be controlled. Configured as such, the bypass conduit 125 allows for control valves 131 located on the remaining expellant locations 126, 128 and 130 to independently attain the flows prescribed by the control system requirements without adjusting the total flow through the recycle blower 124.

Figure 2:
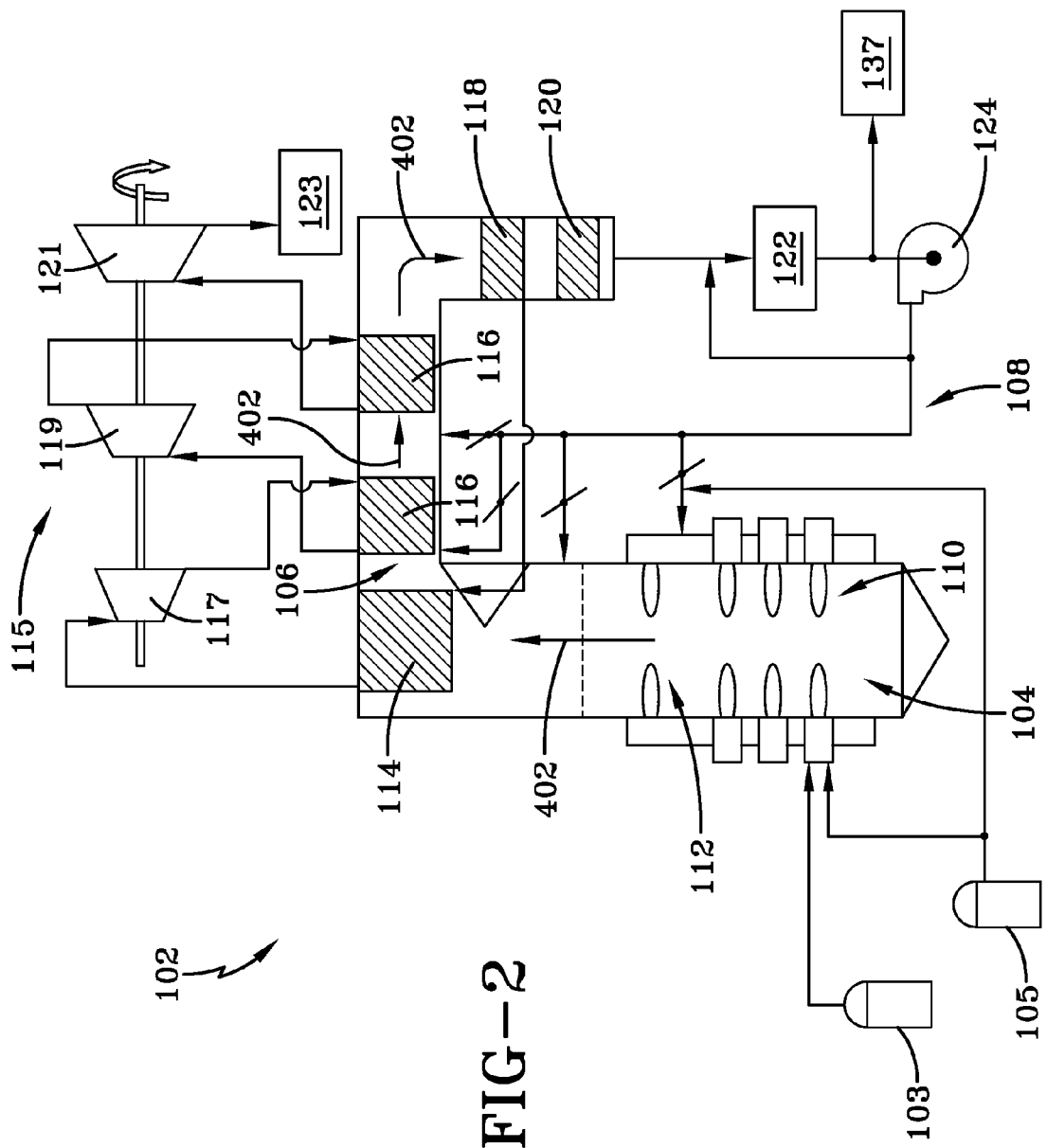
FIG. 2 illustrates a schematic view of an exemplary embodiment of a combustion system with steam control.

In the embodiment illustrated by FIG. 2, the combustion system 102 includes two stages of reheat superheating. This embodiment permits an additional expellant location adjacent to, and upstream from, the second of the reheat superheaters 116. For the purpose of this illustration, it is assumed that the second of the reheat superheaters 116 receives steam from the intermediate pressure turbine 119 and delivers steam to the lower pressure turbine 121. As with the above description, as will be appreciated, extraction of steam may occur between the various turbine sections.

As illustrated in FIG. 1, flow of recycled flue gas to and through the expellant locations 126, 128, and 130 is controlled by a flow control mechanism. In one embodiment, the flow control mechanism is a flow control valve 131. However, in other embodiments, the flow control mechanism may be the recycle blower 124 (with or without integral flow control), a control valve, an injection nozzle, the conduit itself, nothing at all, or combinations thereof. In the embodiment with the flow control mechanism being integral, the flow control mechanism recycle blower 124 may include a variable speed drive, an inlet damper, an outlet damper, an other device, or combinations thereof. The illustration in FIG. 1 includes expellant locations 126, 128, and 130 with the flow control valves 131 as the flow control mechanisms. In one embodiment, one of the expellant locations 126, 128, or 130 may omit the flow control mechanism 131. In this embodiment, the flue gas recycle flow through the expellant location 126, 128, or 130 without the flow control mechanism 131 is determined by the total flow delivered by the recycle blower 124 minus the flows through the control valves in each of the remaining conduits. In another embodiment, a plurality of the recycle blowers 124 may be included. In a further embodiment, individual blowers 124 for each expellant location 126, 128, and 130 are included.

Figure 3:
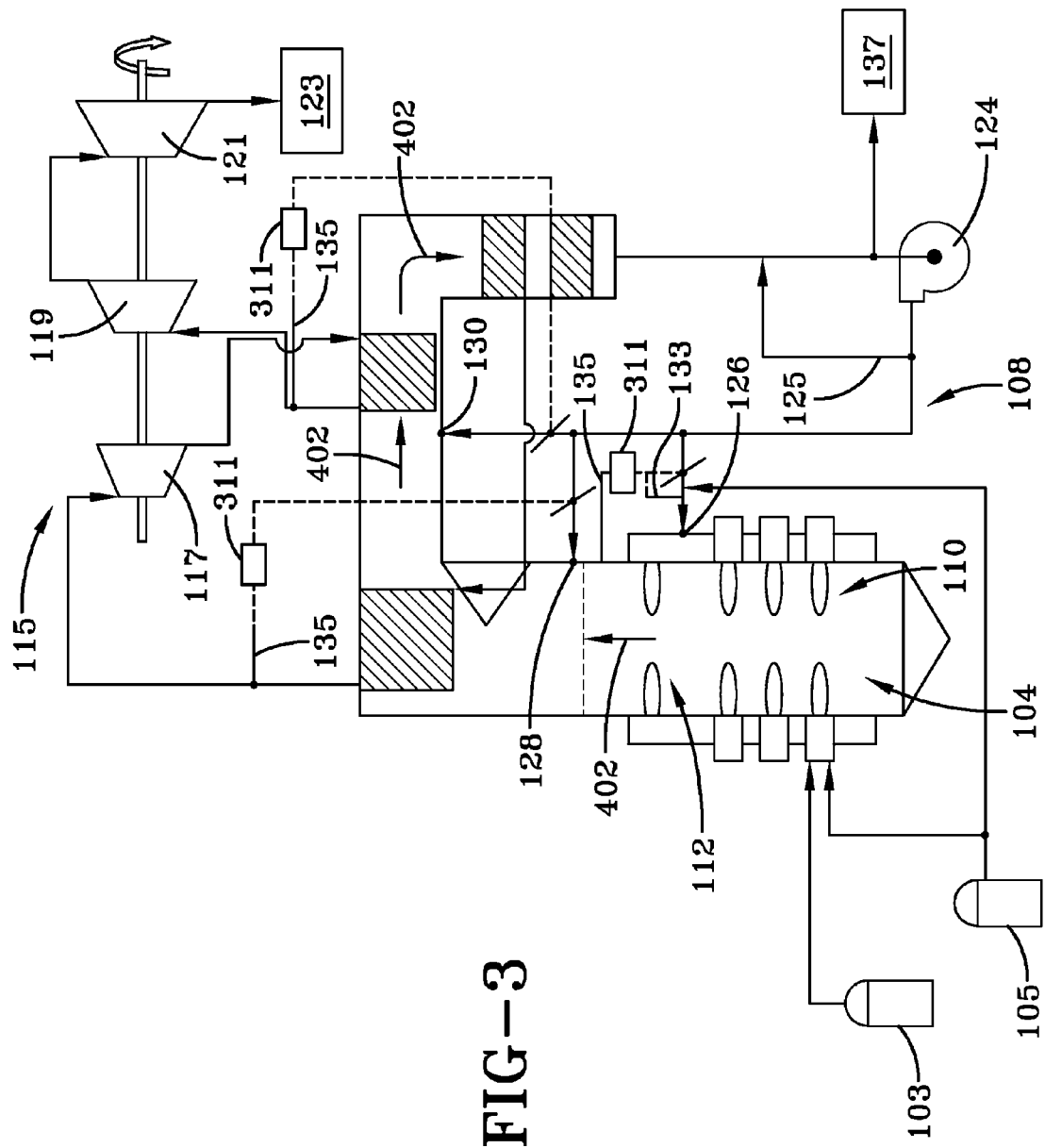
FIG. 3 illustrates a schematic view of an exemplary embodiment of a combustion system with steam control.

As illustrated in FIG. 3, in one embodiment, a flow measuring element and/or flow transmitter 133 (hereinafter "flow element/transmitter") is included. Flow elements include, but are not limited to, venturis, flow nozzles, orifice plates, hot wire anemometers, and ultrasonic meters. Flow transmitters convert the flow measurement produced by the element into a signal, typically an electrical signal, which can be understood and acted upon by a control system 311. In the embodiment shown in FIG. 3, the flow element/transmitter 133 is used only in the furnace expellant location 126 in the general combustion zone. In other embodiments, multiple flow elements/transmitters 133 may be included. It will be appreciated that additional flow elements/transmitters 133 can be advantageously placed and utilized in any or all of the expellant locations 126, 128, 130, or combinations thereof. In the embodiment illustrated by FIG. 3, the flow element/transmitter 133 is configured to be used in conjunction with the flow control valve 131 in the furnace expellant location 126 to maintain a constant recycle flow through the furnace expellant location 126 while the flows to the conduits 128 and 130 are regulated to maintain desired main and reheat steam temperatures. The advantage of such a configuration is that the flame properties are undisturbed during normal operation, which will lead to steadier, more stable, more efficient, and safer operation of the combustion system 102.

In one embodiment, a control system 311 may be provided to control the flow of recycled flue gas through the expellant locations 126, 128, and 130. As illustrated in FIG. 3, the control system 311 may be configured to utilize feedback from a temperature measuring element and/or temperature transmitter 135 (hereinafter "temperature element/transmitter") in the main steam conduit and the reheat steam conduit to modulate flue gas recycle flow through the conduits 128 and 130. Simultaneously, the control system 311 utilizes feedback from the flow elements/transmitters 133 in the furnace expellant location 126 to modulate recycled flue gas flow to the general combustion zone. In one embodiment, the control system 311 is configured to use feedback from the temperature element/transmitter 135 located at or near the end of the general combustion zone to provide additional limitation on the control of recycled flue gas flow through the furnace expellant location 126. In the embodiment, the temperature element/transmitter 135 at the discharge to the general combustion zone may indicate when a higher temperature limit to the furnace 104 exit temperature has been reached. In such a circumstance, the flow control valve 131 in the recycle expellant location 126 would open to provide additional diluent to the combustion zone to incrementally lower the general combustion zone exit temperature. In the embodiment, excess recycled flue gas flow delivered by the recycle blower 124 that is not required in the expellant locations 126, 128 and 130 will flow to bypass conduit 125 and thereby be recycled to the blower intake. Such control of recycled flue gas flow should provide gains in both power generation and turbine cycle efficiency in comparison to known approaches. It will be appreciated by one of ordinary skill in the art that numerous other process measurements and control strategies may be employed depending upon combustion system-specific operating requirements, while still within the present disclosure.

Figure 4:
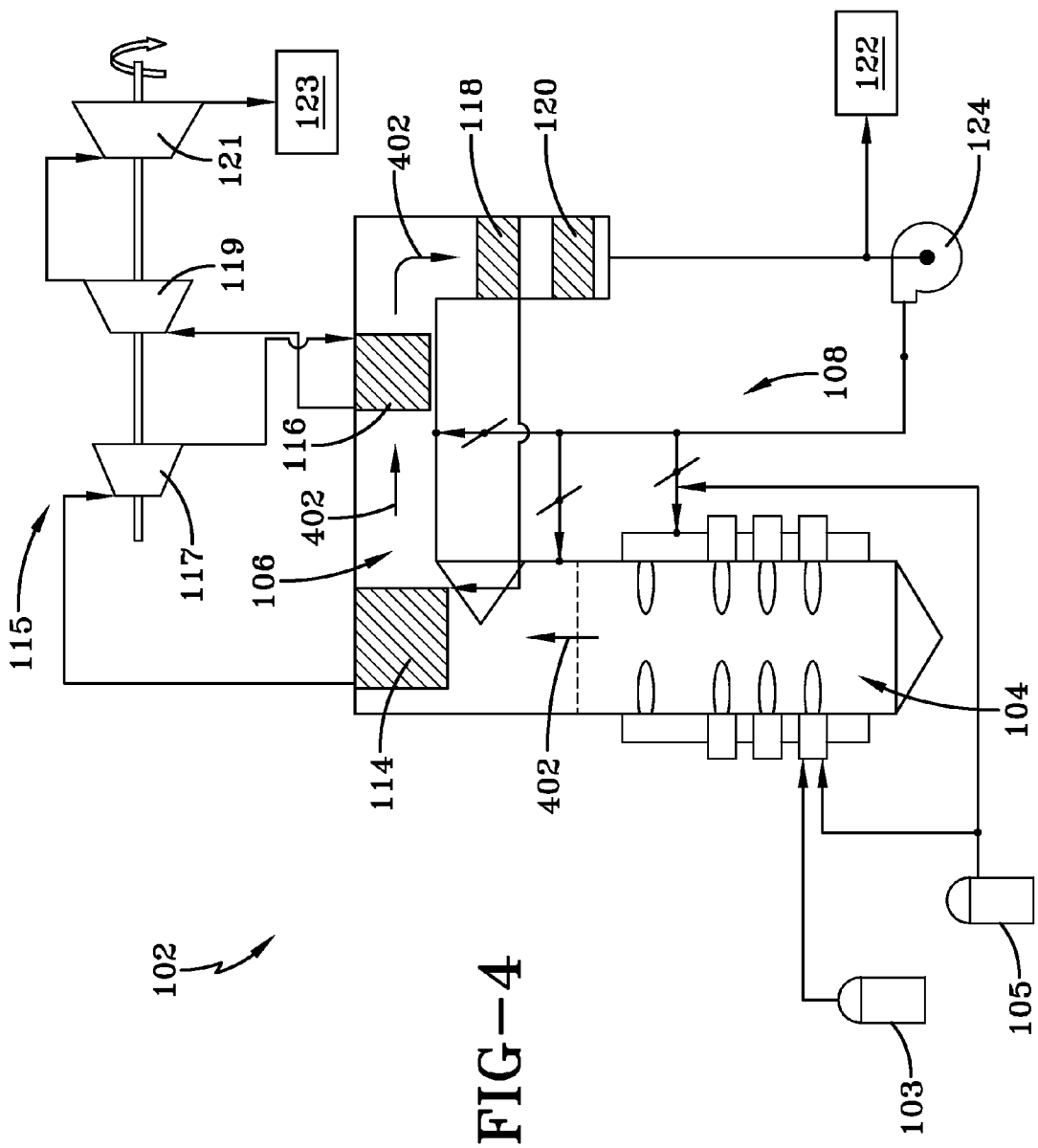
FIG. 4 illustrates a schematic view of an exemplary embodiment of a combustion system with steam control.

FIG. 4 illustrates an exemplary embodiment of the combustion system 102. Specifically, FIG. 4 illustrates the combustion system 102 with combustion fluid 402 withdrawn upstream of the cooling and cleanup apparatus 122. As illustrated in FIG. 2, the combustion system 102 is arranged and disposed to permit the gas to be recycled immediately after the combustion fluid 402 or flue gas exits the economizer 120, likely at a temperature between 700° and 800° F.

Figure 5:
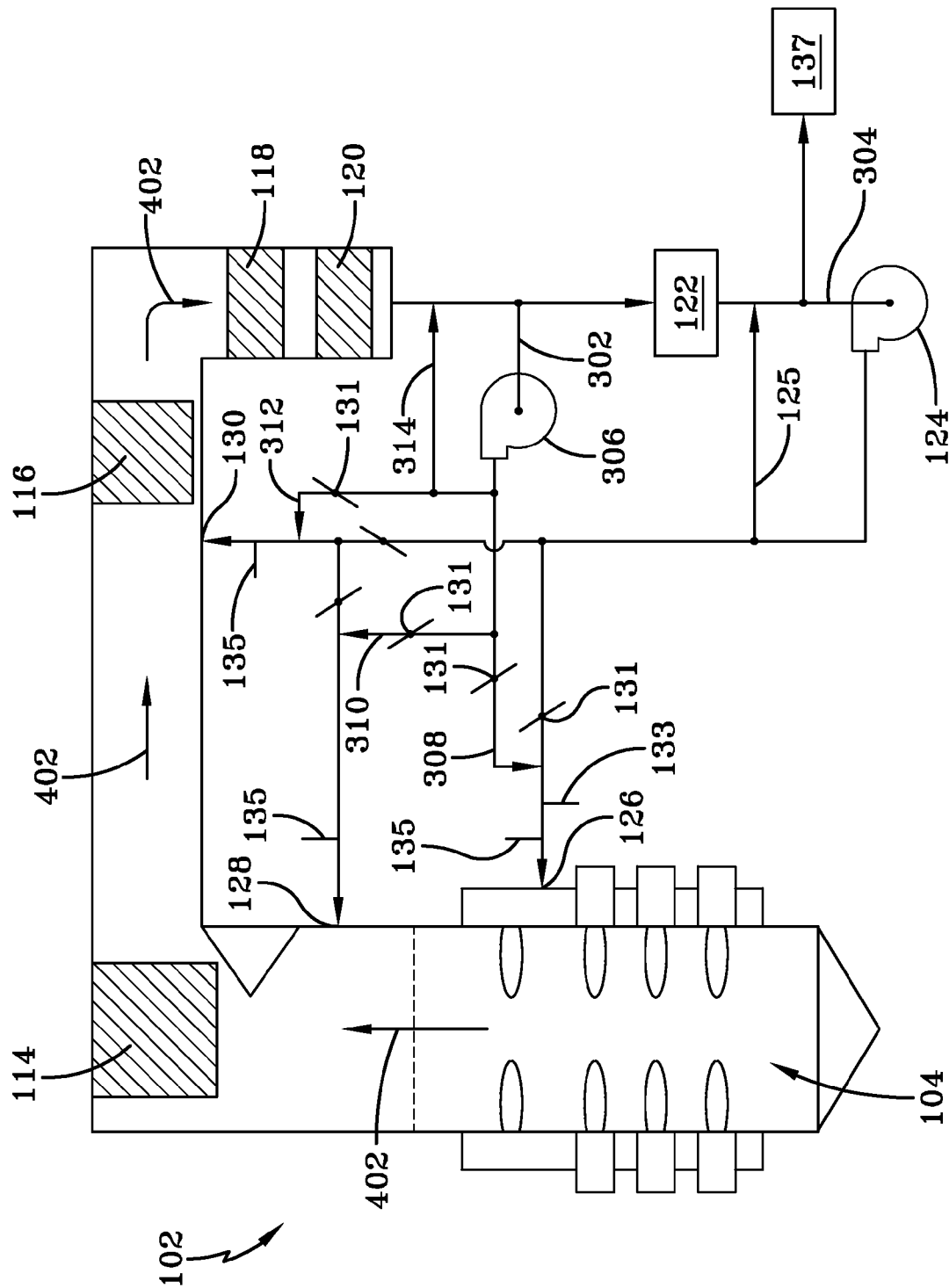
FIG. 5 illustrates a schematic view of an exemplary embodiment of a combustion system with steam control.

FIG. 5 illustrates an exemplary embodiment of the combustion system 102. Specifically, FIG. 5 illustrates the combustion system 102 with recycled flue gas from both a hotter source 302, which relies upon combustion fluid 402 exiting the economizer 120, and a cooler source 304, which relies upon combustion fluid 402 exiting the additional gas and cooling cleanup apparatus 122, thereby enabling an expanded range of steam temperature control beyond that which can be attained with recycle from a single location. In the embodiment shown in FIG. 5, the cooler source 304 leads to the recycle blower 124, the furnace expellant location 126, the intermediate expellant location 128, the convective expellant location 130, and the bypass conduit 125. Also in the embodiment illustrated in FIG. 5, the hotter source 302 leads to a second recycle blower 306, a second furnace expellant location 308, a second intermediate expellant location 310, a second convective expellant location 312, and a second bypass conduit 314. As illustrated in FIG. 5, expellant locations 308, 310, and 312 fed by the hotter source 302 are configured to be controlled by the flow control mechanisms 131 corresponding with the expellant locations 308, 310, and 312, upstream from expellant locations 126, 128, and 130, respectively.

As illustrated in FIG. 5, expellant location 126 includes flow element/transmitter 133, and expellant locations 126, 128, and 130 include temperature elements/transmitters 135. The temperature elements/transmitters 135 are configured to provide information to a control permitting the flow control mechanisms 131 to modify the flow from the hotter source 302 and the cooler source 304 thereby permitting temperature control. The flow element/transmitter 133 in expellant location 126 is configured to permit independent measurement and control of both the total flow rate and temperature of the blended recycle stream. In the embodiment, the flow element/transmitter 133 is configured to control temperature of the recycle stream by the relative proportion of flow from the hotter source 302 and the cooler source 304 in the expellant location 126, while the total flow can be independently controlled by keeping the hotter/cooler proportion constant while increasing or decreasing the total flow of each (i.e. hotter/cooler) stream. It will be appreciated that additional flow and temperature measurements advantageously placed in either the hotter or cooler (or both) recycle conduits will further add to the functionality of the control system. In addition, it will be appreciated that the configuration of providing flow from the hotter source 302 and the cooler source 304 is exemplary and may be achieved in numerous other manners.

Figure 6:
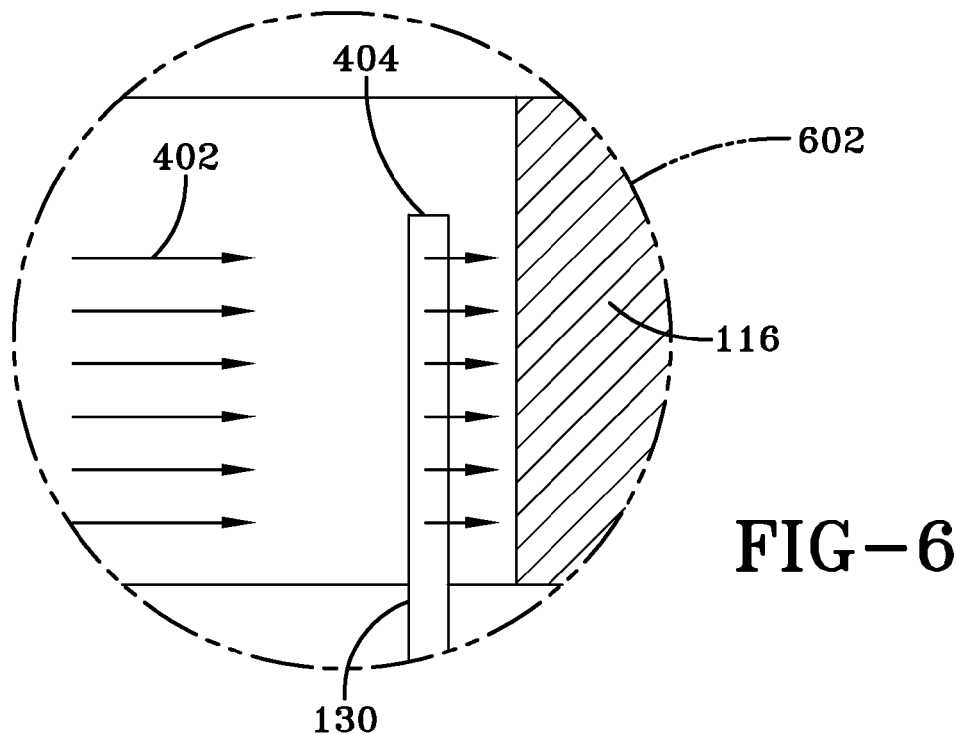
FIG. 6 illustrates a schematic elevation view of a manner of distributing flue gas throughout a conduit.
Figure 7:
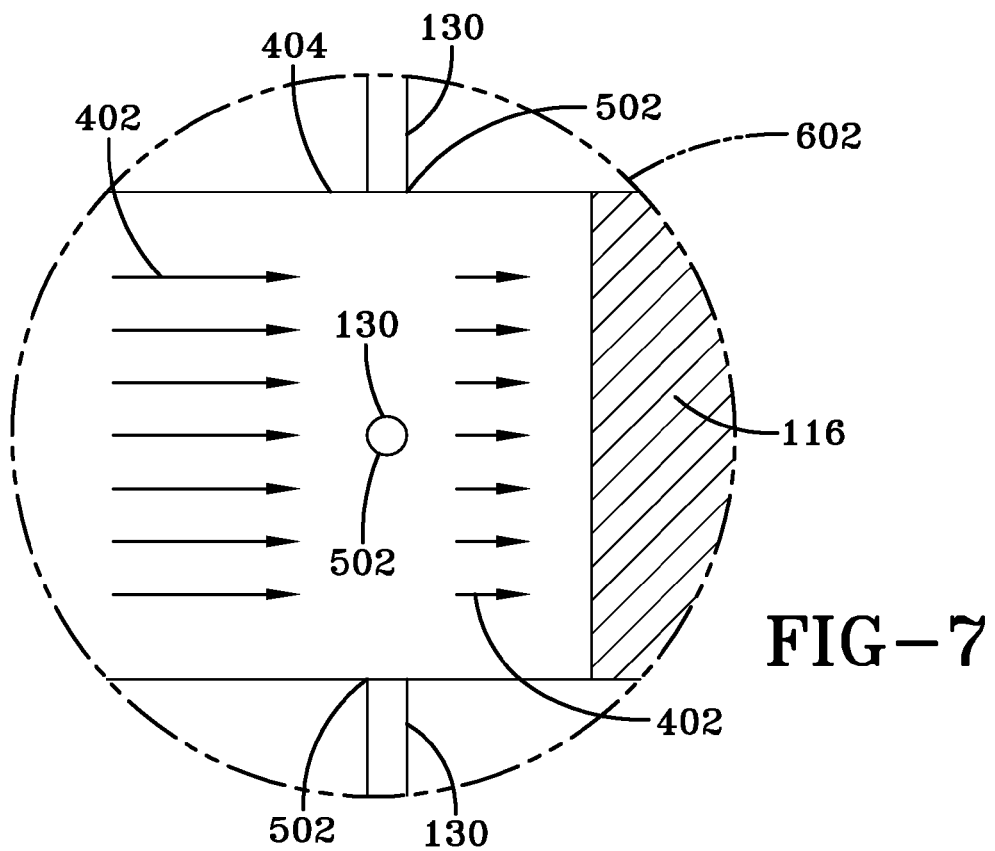
FIG. 7 illustrates a schematic elevation view of a manner of distributing flue gas throughout a conduit.
Figure 8:
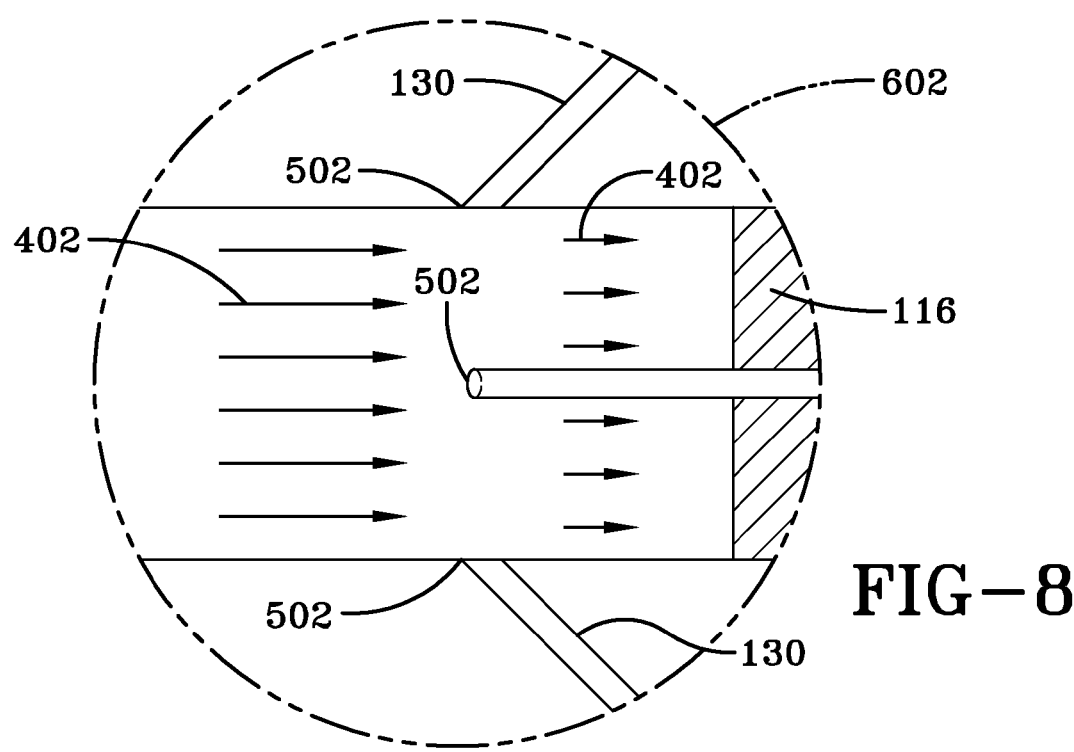
FIG. 8 illustrates a schematic elevation view of a manner of distributing flue gas throughout a conduit.
Figure 9:
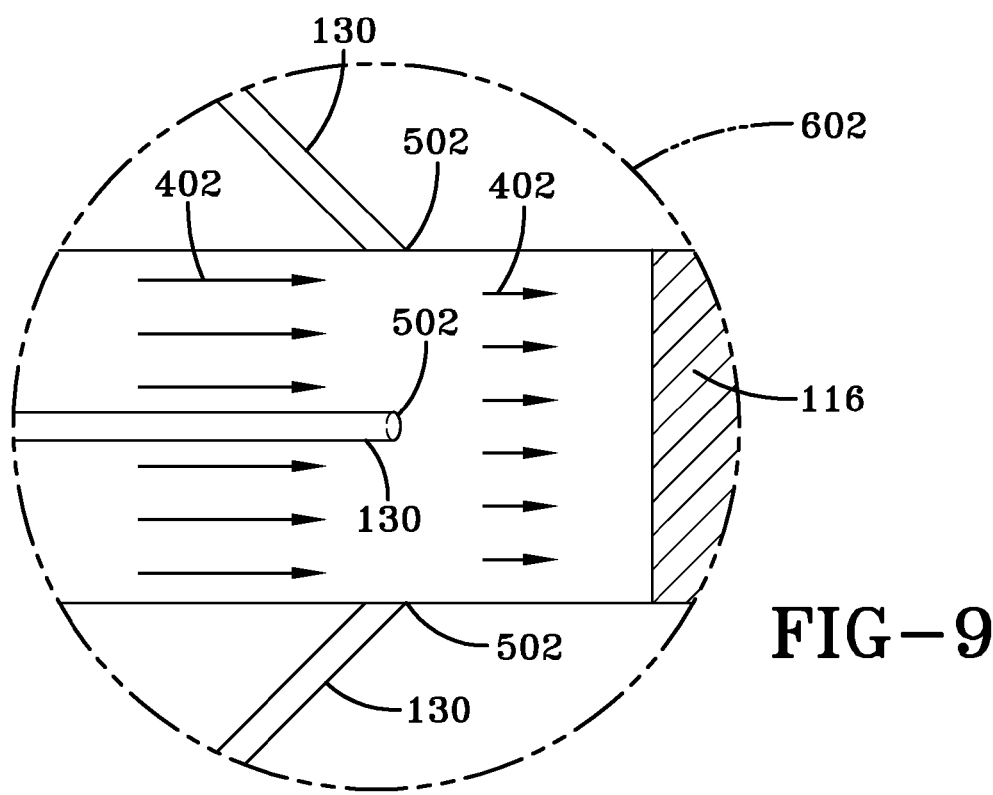
FIG. 9 illustrates a schematic elevation view of a manner of distributing flue gas throughout a conduit.

FIG. 6 through 9 illustrate manners of distributing flue gas. As illustrated in FIGS. 6 through 9, the expellant location 130 may include a mixing device specifically configured to increase the mixing of recycled flue gas and combustion fluid 402. Although the illustrated expellant location is depicted as expellant location 130, the mixing device may be used at expellant locations 126, 128, 130, 308, 310, and/or 312. Distributing recycled flue gas and rapid mixing are desirable for increased efficiency and precision of control. As illustrated in FIGS. 6, in one embodiment, a lance 404 may be inserted at the expellant location 130 to distribute the flue gas throughout the entire cross-section. FIG. 7 illustrate another manner of distributing flue gas at the expellant location 130. In FIG. 7, a plurality of injection nozzles 502 is mounted at or near the expellant location 130. It will be appreciated that the nozzles 502, which may be of circular or non-circular cross-section, may be oriented at 90 degree angles to the flow of oncoming gas as depicted in FIG. 7, or at different angles. FIG. 8 illustrates the nozzle 502 at an angle other than 90 degrees in the direction of the flow of flue gas. FIG. 9 illustrates the nozzle 502 at an angle other than 90 degrees in the opposite direction of the flow of flue gas.

Figure 10:
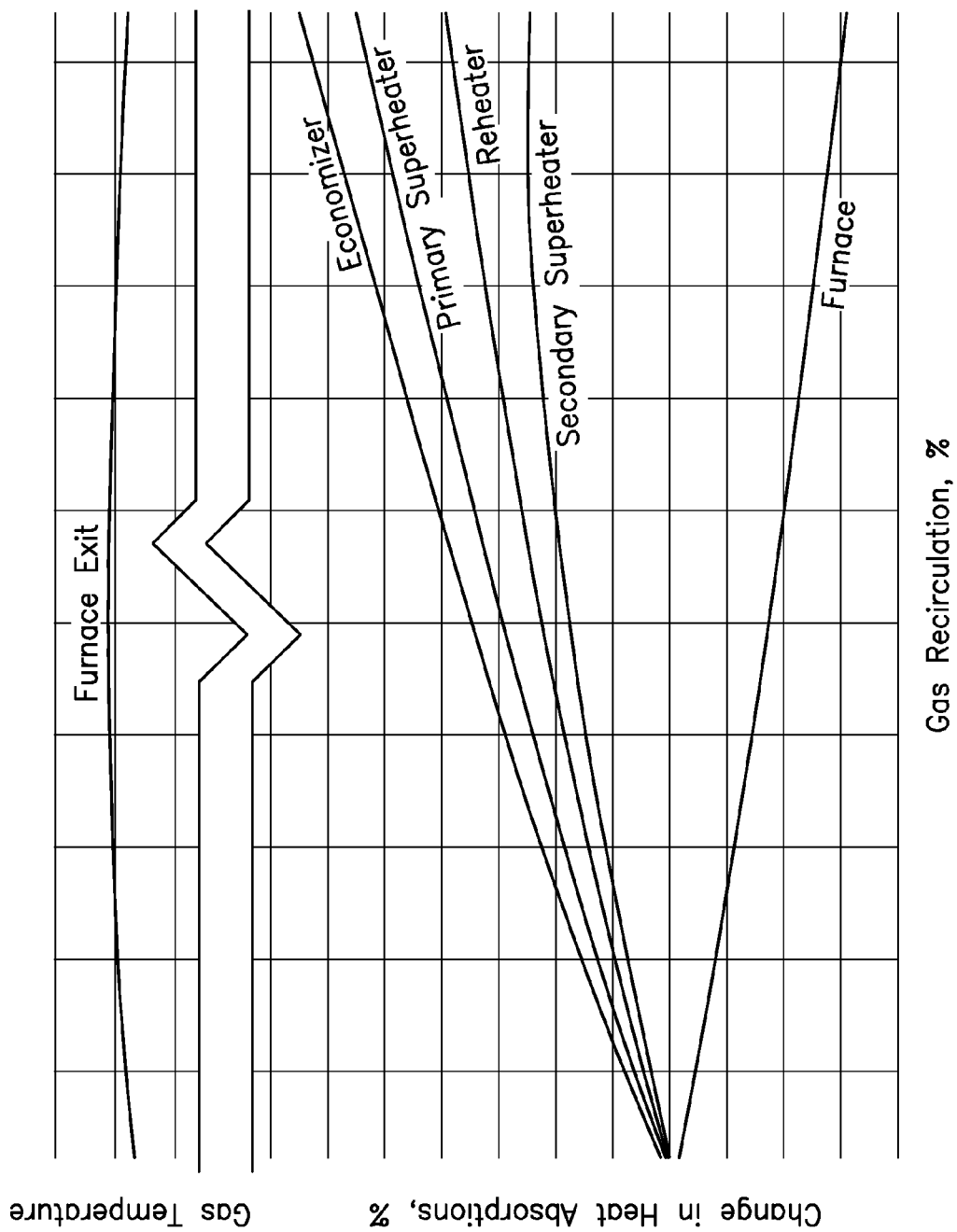
FIG. 10 graphically illustrates a typical variation of heat absorption across the sections of an air/fuel boiler to flue gas recycle introduced into the bottom of the furnace.

FIG. 10 illustrates an exemplary variation of gas temperature and heat absorption across the sections of an air/fuel boiler to flue gas recycle introduced into the bottom of the furnace. FIG. 8 illustrates the differing response magnitudes of the furnace 104, the secondary superheater 114, the reheat superheater 116, the primary superheater 118, and the economizer 120. It will be appreciated that such a response will generally result in a divergent response of steam temperature in the main steam conduit and the reheat steam conduit with an increasing rate of recycled flue gas.

Figure 11:
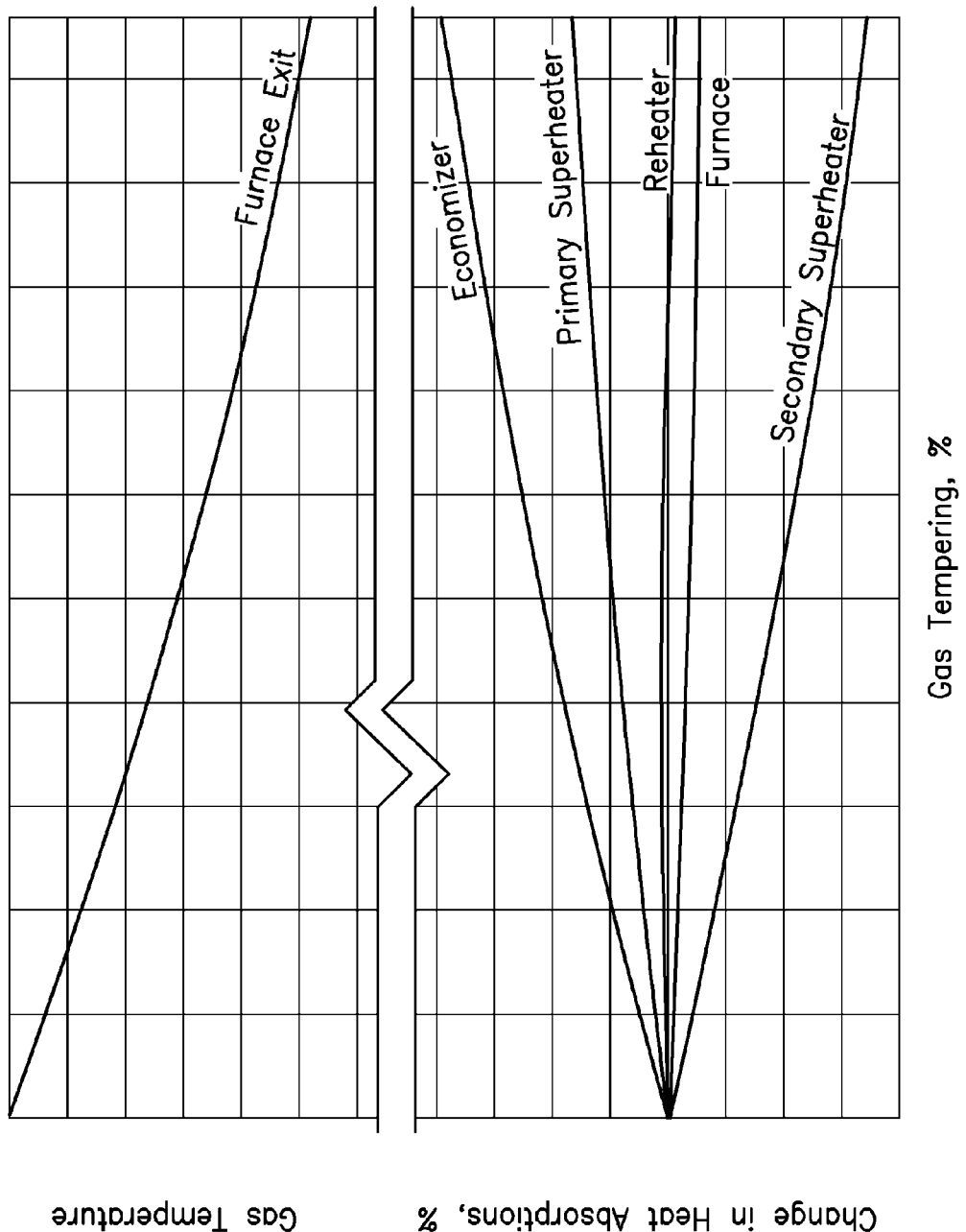
FIG. 11 graphically illustrates a variation of heat absorption when the flue gas is introduced downstream of the furnace but upstream of the convective section.

FIG. 11 illustrates an exemplary variation of gas temperature and heat absorption when the flue gas is introduced downstream of the furnace 104 but upstream of the convective section 106 (referred to as gas tempering). Although the specific responses are different than the configuration illustrated in FIG. 10, the reheat superheater 116 response again differs from the primary superheater 118 and the secondary superheater 114, and would generally lead to a divergence between the steam temperature in the main steam conduit and reheat steam conduit.

In one embodiment, the disclosure is applied to retrofit existing air/fuel combustion systems with the same modifications as are herein disclosed for oxy/fuel combustion systems. Application of the present disclosure to air/fuel combustion systems should lead to the same or similar performance. Thus, the present disclosure is additionally intended to cover application of these modifications to air/fuel combustion systems retrofitted with oxy/fuel combustion technology.

The benefits of the present invention for utilizing flue gas recycle, and control thereof, for simultaneous control of main and reheat steam temperature relative to known methods are partially illustrated in the following example.

EXAMPLE

Figure 12:
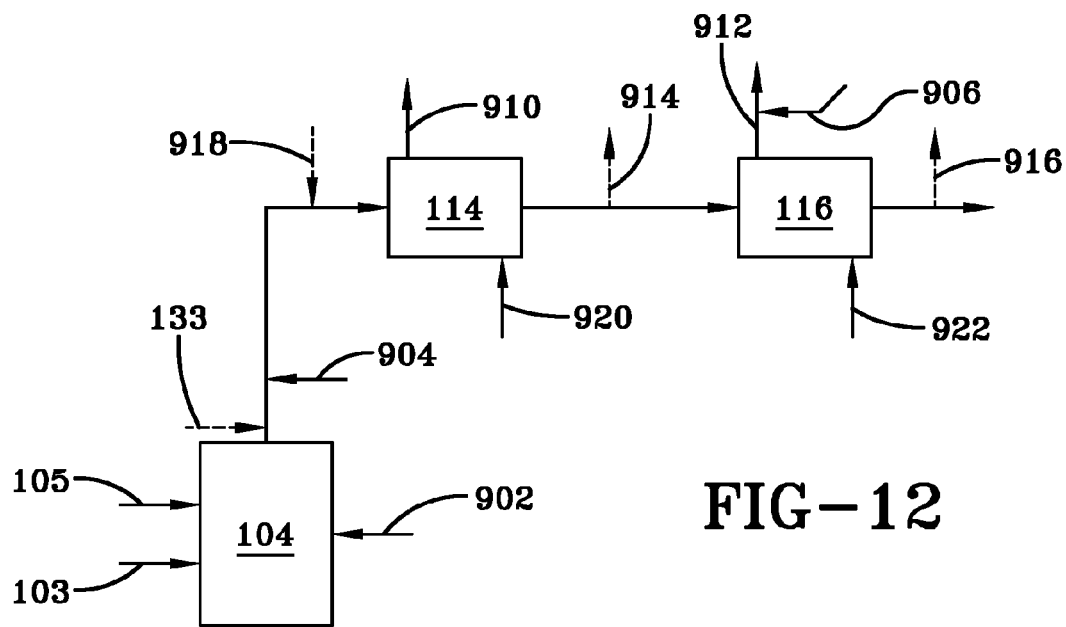
FIG. 12 illustrates a schematic representation of the flow of flue gas through the system.

A known combustion system, specifically a boiler steam control system, includes an oxy/fuel boiler firing bituminous coal producing steam at sub-critical conditions to generate approximately 593 MW of gross electrical power using a single reheat Rankine cycle for the turbine. FIG. 12 illustrates a schematic representation of the flow of combustion fluid 402 through a portion of the known system. As illustrated in FIG. 12, the portion of the known system includes the furnace 104, the secondary superheater 114, and the reheat superheater 116 (also referred to as a reheater). To simplify analysis, the secondary superheater 114 and the reheat superheater 116 are each assumed to exist in a single heat transfer section.

The furnace 104 is arranged and disposed to receive fuel, oxidizer, and recycled flue gas. Specifically, a first stream 902 of recycled flue gas is added to the general combustion zone of the furnace 104.

In addition, a second stream 904 of recycled flue gas is included immediately upstream of the secondary superheater 114. The control system lowers main steam temperature by increasing flow of the second stream 904, and raises main steam temperature by decreasing flow of the second stream 904 in response to the measured main steam temperature at a point 910 permitting the measurement of the steam temperature exiting the superheater. The main steam conduit and reheat steam conduit are both designed for temperatures of steam at about 1000° F. and pressure of steam at about 2400 psia.

Reheat steam temperature is controlled using a desuperheating spray apparatus 906. The desuperheating spray apparatus 906 is configured to operate by introducing a flow rate of relatively lower temperature water or steam into the discharge of the reheat superheater 116 in an amount that allows the mixed reheat steam temperature, measured at a second point 912 permitting measurement of the steam temperature existing the reheater, to be cooled to a temperature of about 1000° F. In the event that the temperature measured at the second point 912 is lower than 1000° F., no known (prior to this disclosure) means are available to independently increase the reheat steam temperature to its desired value.

Figure 13:
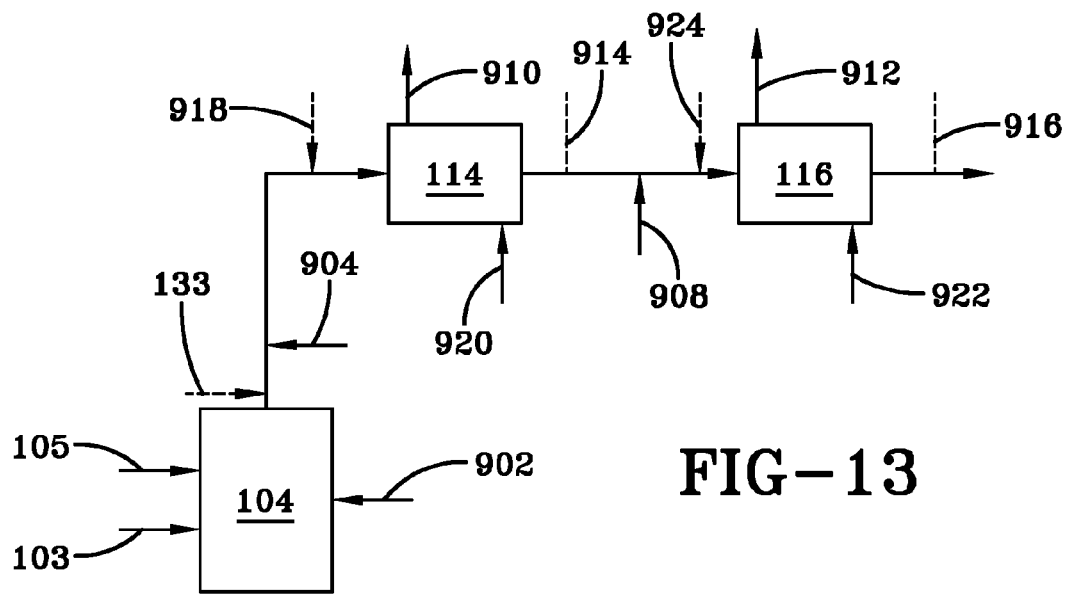
FIG. 13 illustrates a schematic representation of the flow of flue gas through the system.

In another combustion system, a steam control system includes the same type of turbine cycle considered to be powered from an oxy/fuel boiler of the present disclosure wherein recycled flue gas recycle is included at three locations. FIG. 13 illustrates a schematic representation of the flow of recycled flue gas through this embodiment of the boiler. This system includes an arrangement of components that are known in the art, but further includes a third stream 908 of recycled flue gas and does not include desuperheating spray apparatus 906. The third stream 908 is located upstream of the reheat superheater 116. The flow rate of the third stream 908 may be decreased in magnitude by the control system to increase final reheat steam temperature, measured at the second point 912, and increased by the control system in order to lower the temperature measured at the second point 912. Similarly, in other embodiments, further control may be achieved by monitoring measurements at a third point 914 measuring the temperature of gas exiting the superheater, at a fourth point 916 measuring the temperature of gas exiting the reheater, at a fifth point 918 measuring the temperature of gas entering the superheater, at a sixth point 920 measuring the temperature of steam entering the superheater, at a seventh point 922 measuring the temperature of steam entering the reheater, and/or at an eighth point 924 measuring the temperature of gas entering the reheater.

Table 1 illustrates turbine cycle and boiler data common to the known systems and the presently disclosed system. It is assumed that the steam entering the superheater 114 and reheat superheater 116 is in a saturated state at the respective inlet pressure. Convection surface areas were adjusted between the two boilers to achieve design steam temperatures. In the present disclosure, any or all of the variables identified in Table 1 may be monitored and adjusted to control the system.

TABLE 1

| Parameter | Units | Value |
| --- | --- | --- |
| Gross Power Generation | MW | 593 |
| Main Steam Temperature | Deg F. | 1000 |
| Reheat Steam Temperature | Deg F. | 1000 |
| Main Steam Flow Rate | Lb/hr | 4011300 |
| Reheat Steam Flow Rate | Lb/hr | 3586115 |
| Drum Pressure | Psia | 2400 |
| Steam Pressure at Reheater Inlet | Psia | 607 |
| Secondary Combustion Zone Exit Gas Temperature | Deg F. | 2750 |
| Flue Gas Recycle Temp | Deg F. | 300 |

To illustrate the benefit of the present disclosure, mass and energy balances were performed for each boiler for three conditions: 1) baseline condition in which the heat exchangers are substantially clean (i.e. not fouled) and operating at their designed level of efficiency, 2) the secondary superheater 114 fouled to an extent that reduces the overall superheater heat transfer coefficient by 7.5%, and 3) the reheat superheater 116 fouled to an extent that reduces the overall reheater heat transfer coefficient by 7.5%. The overall heat transfer coefficient, U, is defined herein by the following expression:

$$Q = U * A * LMTD \quad (1)$$

Where Q is the heat transfer rate from gas to steam in units of Btu/hr; U is the overall heat transfer coefficient in units of Btu/hr/ft2/deg F.; A is the heat transfer area, for example the external surface area of the steam tubes, with units of ft2, and LMTD is the log mean temperature difference between the flue gas and steam, expressed in units of degrees F. The LMTD for each heat exchanger is defined by the following expression:

$$LMTD = [\Delta T_{hot} - \Delta T_{cold}] / ln[\Delta T_{hot} / \Delta T_{cold}] \quad (2)$$

$$\text{where; } \Delta T_{hot} = T_{flue\ gas\ in} - T_{steam\ out} \quad (3)$$

$$\text{and; } \Delta T_{cold} = T_{flue\ gas\ out} - T_{steam\ in} \quad (4)$$

Derived as such, the relative cleanliness factor, $F_{cl}$, of the respective heat transfer sections is defined as the ratio of $U_{actual}/U_{clean}$, and can be approximated from readily obtained process operating data as follows:

$$F_{cl} = [(T_{steam\ out} - T_{steam\ in})_{actual} * LMTD_{clean}] / [(T_{steam\ out} - T_{steam\ in})_{clean} * LMTD_{actual}] \quad (5)$$

As expressed, the dimensional units expressed above are exemplary and can be replaced by any other units or sets of units expressing the same dimensional relationships; e.g. degrees Fahrenheit can be replaced by degrees Celsius, etc. In performing the above analysis, it was assumed that all parameters given in Table 1 were unaffected by the fouling, and that the flow rate of the first stream 902 of flue gas recycle would remain unaltered so as to prevent disturbance of the burner flames.

The above analysis applied to known methods of steam temperature control (excluding that of the embodiments of this disclosure) yielded the results illustrated in Table 2. For the superheater 114 fouling case, the second stream 904 of flue gas recycle is reduced by an amount equal to nearly 60% of the stack flow, resulting in a much hotter gas entering the superheater 114 (+263°F.), which thereby enables recovery of the main steam temperature which would have otherwise been reduced as a result of fouled superheater. However, as a consequence of the superheater 114 fouling and the change in the flow rate of the second flue gas recycle stream 904, the flue gas temperature entering the reheater increases by nearly 200° F., which results in an uncontrolled increase in reheat steam temperature to about 1036° F. The desuperheating spray flow rate required to lower the reheat temperature back down to 1000° F. (assuming a desuperheating spray enthalpy of 324.3 Btu/lb), is equal to approximately 1.65% of the main steam flow rate. From a thermal performance standpoint, such a control action is not desirable since the use of desuperheating spray results in a power generation and thermal efficiency penalty.

TABLE 2

| Parameter | Units | Baseline | Superheater Fouled | Reheater Fouled |
|---|---|---|---|---|
| Relative Cleanliness Factor for Superheater | None | 100 | 92.5 | 100 |
| Relative Cleanliness Factor for Reheater | None | 100 | 100 | 92.5 |
| FGR 1 | % Stack Flow | 180 | 180 | 180 |
| FGR 2 | % Stack Flow | 120 | 63 | 120 |
| FGR 3 | % Stack Flow | 0 | 0 | 0 |
| ΔFlue Gas Temperature Entering Superheater | Deg F. | 0 | 263 | 0 |
| ΔFlue Gas Temperature Entering Reheater | Deg F. | 0 | 195 | 0 |
| Main Steam Temperature | Deg F. | 1000 | 1000 | 1000 |
| Uncontrolled Reheat Steam Temperature | Deg F. | 1000 | 1036 | 974 |
| Reheat Desup Flow to Achieve 1000° F. | % of Main Stm Flow | 0.0 | 1.65 | N/A |

For the reheat reheater 116 fouled case, the superheater 114 is unaffected relative to baseline. However, with no practical or efficient mechanism for increasing the reheater heat transfer (apart from soot blowing, which would not be economical to continuously apply), the reheat steam temperature drops by 26° F., again resulting in a significant thermal performance penalty.

Table 3 summarizes the results for the combustion system 102 operating under the present disclosure. As shown in Table 3, the combustion system 102 is operated by including the first stream 902 of flue gas recycle, the second stream 904 of flue gas recycle, and the third stream 908 of flue gas recycle, even for the baseline case. For the superheater 114 fouled case, similar to the known systems, the second stream 904 of flue gas recycle is reduced by approximately the same amount (60% of the stack flow) to increase the superheater 114 inlet gas temperature and attain the desired main steam temperature. However, to balance this action, the third stream 908 of flue gas recycle increases by approximately 60% of the stack flow to compensate for the lower exit gas flow rate and higher flue gas temperature exiting the superheater 114, resulting in the attainment of the desired steam temperature of about 1000° F. in the reheat steam conduit.

TABLE 3

| Parameter | Units | Baseline | Superheater Fouled | Reheater Fouled |
|---|---|---|---|---|
| Relative Cleanliness Factor for Superheater | None | 100 | 92.5 | 100 |
| Relative Cleanliness Factor for Reheater | None | 100 | 100 | 92.5 |
| FGR 1 | % Stack Flow | 180 | 180 | 180 |
| FGR 2 | % Stack Flow | 60 | 0.8 | 60 |
| FGR 3 | % Stack Flow | 60 | 119 | 16 |
| ΔFlue Gas Temperature Entering Superheater | Deg F. | 0 | 385 | 0 |
| ΔFlue Gas Temperature Entering Reheater | Deg F. | 0 | 1 | 147 |
| Main Steam Temperature | Deg F. | 1000 | 1000 | 1000 |
| Uncontrolled Reheat Steam Temperature | Deg F. | 1000 | 1000 | 1000 |
| Reheat Desup Flow to Achieve 1000° F. | % of Main Stm Flow | 0.0 | 0.0 | 0.0 |

For the reheater 116 fouled case, while the superheater temperature and flow rates remain unchanged from the baseline case, the third stream 908 of flue gas recycle is reduced to increase the reheat inlet gas temperature, thus allowing for recovery of the reheat steam temperature to its baseline value.

The preceding example, which is for illustration purpose only, shows that the present disclosure enables independent control of the temperature of steam in the main steam conduit and the reheat steam conduit with flue gas recycle alone (apart from the use of desuperheating sprays). That there are resultant benefits to turbine cycle efficiency and gross power generation due to the avoidance of desuperheating sprays and/or deficiencies in steam temperature will be apparent to one of ordinary skill in the art. This benefit, which is dependent on the details of the turbine cycle, is not quantified herein.

It will be appreciated by those skilled in the art that many other scenarios could be envisioned wherein the present disclosure could provide performance benefits relative to prior art steam temperature control technology. These include, but are not limited to, fouling of the general combustion zone, variations in fuel quality, fluctuations in boiler load and compensation of design deficiencies (e.g. caused by incorrect specification of convection surface area). The preceding example should, therefore, not be considered as limiting the scope of the disclosure.

While the disclosure has been described with reference to a preferred embodiment, it will be understood by those skilled in the art that various changes may be made and equivalents may be substituted for elements thereof without departing from the scope of the disclosure. In addition, many modifications may be made to adapt a particular situation or material to the teachings of the disclosure without departing from the essential scope thereof. Therefore, it is intended that the disclosure not be limited to the particular embodiment disclosed as the best mode contemplated for carrying out this disclosure, but that the disclosure will include all embodiments falling within the scope of the appended claims.

What is claimed is:
1. An oxy/fuel combustion system comprising:
   a furnace arranged and disposed to combust a fuel to form a combustion fluid;
   a convective section, the convective section having at least a first heat exchanger and a second heat exchanger downstream from the first heat exchanger, each heat exchanger arranged and disposed to exchange heat between the combustion fluid and steam;

a flue gas recycle arranged and disposed to recycle at least a portion of the combustion fluid as a recycled flue gas, the flue gas recycle having two expellant locations downstream of a primary combustion zone and wherein at least one of the expellant locations is downstream of at least one of the heat exchangers; and a flow control mechanism arranged and disposed to selectively provide the recycled flue gas to the combustion fluid, the flow control mechanism having a plurality of conduits and capable of controlling flow of recycled flue gas;

wherein one of the expellant locations is immediately upstream of the first heat exchanger and another of the expellant locations is downstream of the first heat exchanger and immediately upstream of the second heat exchanger; and wherein the flow control mechanism provides controlled amounts of the recycled flue gas to the two expellant locations and independently controls temperature of the steam at the two expellant locations.

2. The combustion system of claim 1, wherein the fuel is solid fuel.

3. The combustion system of claim 1, further comprising an additional expellant location in the primary combustion zone.

4. The combustion system of claim 1, wherein the furnace comprises a secondary combustion zone.

5. The combustion system of claim 4, wherein the secondary combustion zone is arranged and disposed to receive an oxidant.

6. The combustion system of claim 4, wherein the secondary combustion zone is arranged and disposed to receive the solid fuel and an oxidant.

7. The combustion system of claim 1, wherein a windbox is configured to permit the recycled flue gas to be controllably delivered into a general combustion zone;

wherein the control of the recycle flue gas to the windbox is configured to moderate burner flame momentum and temperature.

8. The combustion system of claim 1, wherein at least one of the flow control mechanisms is arranged and disposed to utilize feedback from the main steam conduit and the reheat steam conduit to modulate flow of the flue gas.

9. The combustion system of claim 1, wherein the flue gas recycle is arranged and disposed to transfer the recycled flue gas from a hotter source and a cooler source, thereby enabling an expanded range of steam temperature control.

10. The combustion system of claim 1, wherein the flow control mechanism provides control of flow of recycled flue gas by one or more of flow control valves, recycle blower output and combinations thereof.

11. The combustion system of claim 1, wherein the flue gas recycle has at least two expellant locations downstream of a general combustion zone.

12. The combustion system of claim 11, further comprising an additional expellant location in the general combustion zone.

13. A method of combustion comprising the steps of:
combusting a solid fuel with an oxidant having an O2 concentration greater than air, in a furnace to form a combustion fluid and exchanging heat between the combustion fluid and steam;

delivering the combustion fluid to a convective section having a first heat exchanger and a second heat exchanger downstream from the first heat exchanger and exchanging heat between the combustion fluid and steam in the heat exchangers;

supplying the steam to a steam turbine;

recycling at least a portion of the combustion fluid as recycled flue gas to two expellant locations downstream of a primary combustion zone, one expellant location being immediately upstream of the first heat exchanger and another expellant location being downstream of the first heat exchanger and immediately upstream of the second heat exchanger; and selectively providing recycled flue gas to at least two expellant locations to independently control temperature of the steam in a plurality of steam conduits.

14. The method of claim 13, wherein the fuel is solid fuel.

15. The method of claim 14, further comprising an additional expellant location in the primary combustion zone.

16. The method of claim 15, wherein the flue gas recycle has at least two expellant locations downstream of a general combustion zone.

17. The method of claim 16, further comprising an additional expellant location in the general combustion zone.

18. The method of claim 17, further comprising moderating the flame momentum by controlling the flow of recycled flue gas provided to the windbox.

19. The method of claim 18, further comprising moderating the flame temperature by controlling the flow of recycled flue gas provided to the windbox.

20. The method of claim 19, utilizing feedback from the main steam conduit and the reheat steam conduit to modulate flow of the recycled flue gas.

21. The method of claim 20, further comprising controlling the combustion fluid temperature by adjusting flow of the recycled flue gas from a hotter source and a cooler source.

* * * * *